US010665881B2

(12) United States Patent
Kumamoto et al.

(10) Patent No.: US 10,665,881 B2
(45) Date of Patent: May 26, 2020

(54) REDOX FLOW BATTERY SYSTEM, PUMP CONTROL UNIT, AND METHOD FOR OPERATING REDOX FLOW BATTERY

(71) Applicant: Sumitomo Electric Industries, Ltd., Osaka-shi (JP)

(72) Inventors: Takahiro Kumamoto, Osaka (JP); Kazuhiro Fujikawa, Osaka (JP); Katsuya Yamanishi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 903 days.

(21) Appl. No.: 15/302,422

(22) PCT Filed: Jan. 27, 2016

(86) PCT No.: PCT/JP2016/052231
§ 371 (c)(1),
(2) Date: Oct. 6, 2016

(87) PCT Pub. No.: WO2016/129386
PCT Pub. Date: Aug. 18, 2016

(65) Prior Publication Data
US 2017/0033391 A1  Feb. 2, 2017

(30) Foreign Application Priority Data
Feb. 9, 2015  (JP) .................. 2015-023708

(51) Int. Cl.
*H01M 8/18* (2006.01)
*H01M 8/20* (2006.01)
(Continued)

(52) U.S. Cl.
CPC ............. *H01M 8/188* (2013.01); *H01M 8/20* (2013.01); *H01M 8/0444* (2013.01);
(Continued)

(58) Field of Classification Search
CPC .... H01M 8/188; H01M 8/20; H01M 8/04186; H01M 8/0444; H01M 8/04753
See application file for complete search history.

(56) References Cited

U.S. PATENT DOCUMENTS

2016/0049673 A1* 2/2016 Fukushima ........... H01M 8/188
429/429

FOREIGN PATENT DOCUMENTS

| JP | H07-192747 A | 7/1995 |
| JP | 2006-114359 A | 4/2006 |

(Continued)

OTHER PUBLICATIONS

International Search Report in International Application No. PCT/JP2016/052231, dated Apr. 19, 2016.

*Primary Examiner* — Jimmy Vo
(74) *Attorney, Agent, or Firm* — Baker Botts, L.L.P.; Michael A. Sartori (57) ABSTRACT

A redox flow battery system includes pumps, a pump control unit, an SQC measuring unit, and a terminal-voltage measuring unit. The pump control unit includes a reference-flow-rate acquiring unit which acquires a reference flow rate of the pumps corresponding to the state of charge of electrolytes; a terminal-voltage determination unit which determines whether or not a terminal voltage of a battery cell reaches the lower limit or the ripper limit of a predetermined voltage range; and a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the ease where the terminal voltage reaches the upper or lower limit of the predetermined voltage range.

12 Claims, 3 Drawing Sheets

(51) Int. Cl.
  *H01M 8/0444* (2016.01)
  *H01M 8/04746* (2016.01)
  *H01M 8/04186* (2016.01)

(52) U.S. Cl.
  CPC .... *H01M 8/04186* (2013.01); *H01M 8/04753* (2013.01); *Y02E 60/528* (2013.01)

(56) References Cited

FOREIGN PATENT DOCUMENTS

| | | | | |
|---|---|---|---|---|
| JP | 2009-016217 A | 1/2009 | | |
| JP | 2009-016218 A | 1/2009 | | |
| JP | 2014-523069 A | 9/2014 | | |
| WO | WO-2014162729 A1 | * | 10/2014 | ........ H01M 8/04186 |
| WO | WO-2015/122390 A1 | 8/2015 | | |

* cited by examiner

REDOX FLOW BATTERY SYSTEM, PUMP CONTROL UNIT, AND METHOD FOR OPERATING REDOX FLOW BATTERY

TECHNICAL FIELD

The present invention relates to a redox flow battery system, a pump control unit, and a method for operating a redox flow battery. More particularly, the invention relates to a redox flow battery system, a pump control unit, and a method for operating a redox flow battery in which pump loss can be reduced and stable operation is possible.

BACKGROUND ART

Redox flow batteries have characteristics such as (1) high safety, (2) a long charge-discharge cycle life, (3) ease of capacity increase, and (4) a capability of constantly monitoring the state of charge (SOC), and can be used in various applications. For example, redox flow batteries can be used for load leveling, for voltage sag compensation and emergency power sources, and for smoothing the output of natural energy, such as solar power generation or wind power generation that is being introduced on a massive scale.

In a redox flow battery, a positive electrode electrolyte and a negative electrode electrolyte are circulated and supplied to a battery cell which includes a positive electrode, a negative electrode, and a membrane disposed between the two electrodes, and charging and discharging are performed through a power converter (e.g., an AC-DC converter or the like). As the electrolytes, aqueous solutions containing metal ions (active materials) whose valence is changed by oxidation-reduction are used. Well-known examples include an iron ($Fe^{2+}/Fe^{3+}$)-chromium ($Cr^{3+}/Cr^{2+}$) based redox flow battery in which Fe ions are used as the positive electrode active material and Cr ions are used as the negative electrode active material, and a vanadium ($V^{2+}/V^{3+}$-$V^{4+}/V^{5+}$) based redox flow battery in which V ions are used as active materials for the positive electrode and the negative electrode.

In general, a redox flow battery requires pumps for circulating electrolytes to a battery cell. Accordingly, pump loss occurs. When the redox flow battery is operated always at a constant pump flow rate (electrolyte flow rate), pump loss may increase and battery efficiency may decrease in some cases. Therefore, in existing redox flow batteries, while adjusting the pump flow rate so as to correspond to the state of charge (which may also be referred to as "charging depth") of the electrolytes, the electrolytes are supplied to the battery cell, thus reducing pump loss (for example, refer to PTL 1).

PTL 1 proposes a technique in which by reducing pump loss, battery efficiency is improved. Specifically, a cell resistance value is calculated from the measurement results of a cell terminal voltage, an open circuit voltage, and a load current, and on the basis of the cell resistance value, operation of pumps is controlled with an optimal electrolyte flow rate corresponding to the charging depth (open circuit voltage).

CITATION LIST

Patent Literature

PTL 1: Japanese Unexamined Patent Application Publication No. 2006-114359

SUMMARY OF INVENTION

Technical Problem

Figure 3:
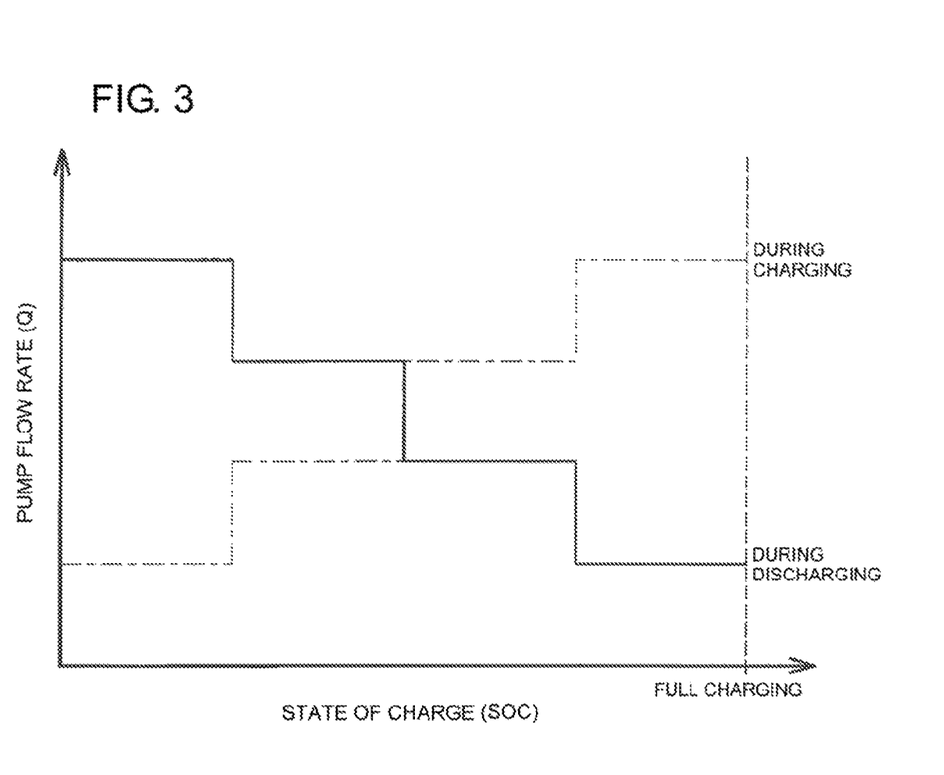
FIG. 3 is a graph showing an example of the relationship between the state of charge and the pump flow rate in the case where the pump flow rate is controlled in response to the state of charge of electrolytes.

In a redox flow battery, in order to reduce pump loss, for example, as shown in FIG. 3, both during discharging and during charging, the pump flow rate corresponding to the state of charge is set within a range of the state of charge of the electrolytes from the discharging end (e.g., state of charge: 15%) to the full charging (e.g., state of charge: 90%). The graph of FIG. 3 shows the relationship between the state of charge (SOC) of the electrolytes and the pump flow rate (Q) both during discharging and during charging (in the graph, the solid line represents during discharging, and the dashed line represents during charging), in which the horizontal axis indicates the state of charge (SOC) of the electrolytes, and the vertical axis indicates the pump flow rate (Q). In this example, the state of charge is divided stepwise into a plurality of ranges, and a pump flow rate is set for each range. During discharging, a discharge reaction takes place in the battery cell, and the state of charge of the electrolytes in the battery cell decreases. In the range where the state of charge of the electrolytes to be supplied to the battery cell is low, the pump flow rate is increased so as to prevent the state of charge from falling below the discharging end and becoming overdischarging (discharge stop) in the battery cell. In the case where the state of charge of the electrolytes is high, the pump flow rate is decreased to such an extent that overdischarging does not occur. On the other hand, during charging, a charge reaction takes place in the battery cell, and the state of charge of the electrolytes in the battery cell increases. In the range where the state of charge of the electrolytes to be supplied to the battery cell is high, the pump flow rate is increased so as to prevent the state of charge from exceeding the full charging and becoming overcharging (overvoltage). In the case where the state of charge of the electrolyte is low, the pump flow rate is decreased to such an extent that overcharging does not occur. In such a manner, by setting a required minimum flow rate corresponding to the state of charge of the electrolytes for the pumps, pump loss can be reduced compared with the case where the pump flow rate is set to be constant.

However, it has been found that, during the operation of a redox flow battery, in the case where the pump flow rate is controlled in response to the state of charge of the electrolytes, the terminal voltage of the battery cell may momentarily vary depending on the operating conditions, and therefore, even when the state of charge of the electrolytes is within a range capable of charging and discharging, the terminal voltage of the battery cell may fall below the lower limit or exceed the upper limit of the operating voltage range of a power converter including an AC-DC converter and charging and discharging may be stopped in some cases. Accordingly, it is desired to develop a redox flow battery which can be stably operated, in which, when a battery cell is in a state capable of charging and discharging, charging and discharging can be continuously performed without unnecessarily stopping charging and discharging.

The present invention has been accomplished under these circumstances, and it is an object of the present invention to provide a redox flow battery system, a pump control unit, and a method for operating a redox flow battery in which pump loss can be reduced and stable operation is possible.

Solution to Problem

A redox flow battery system according to the present invention includes a battery cell, electrolyte tanks, circulation pipes which circulate and supply electrolytes from the electrolyte tanks to the battery cell, pumps which circulate the electrolytes through the circulation pipes, and a power converter which is connected to the battery cell and controls charging and discharging. The redox flow battery system according to the present invention further includes a pump control unit which controls the flow rate of the pumps, an SOC measuring unit which measures the state of charge of the electrolytes, and a terminal-voltage measuring unit which measures a terminal voltage of the battery cell. The pump control unit includes a reference-flow-rate acquiring unit, a terminal-voltage determination unit, and a pump-flow-rate setting unit, which will be described below.

The reference-flow-rate acquiring unit acquires a reference flow rate of the pumps corresponding to the state of charge of the electrolytes.

The terminal-voltage determination unit determines whether or not the terminal voltage of the battery cell reaches the lower limit or the upper limit of a predetermined voltage range.

The pump-flow-rate setting unit sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

A pump control unit according to the present invention is to be mounted on a redox flow battery system. The redox flow battery system includes a battery cell, electrolyte tanks, circulation pipes which circulate and supply electrolytes from the electrolyte tanks to the battery cell, pumps which circulate the electrolytes through the circulation pipes, a power converter which is connected to the battery cell and controls charging and discharging, an SOC measuring unit which measures the state of charge of the electrolytes, and a terminal-voltage measuring unit which measures a terminal voltage of the battery cell.

The pump control unit controls the flow rate of the pumps. The pump control unit includes a reference-flow-rate acquiring unit which acquires a reference flow rate of the pumps corresponding to the state of charge of the electrolytes, a terminal-voltage determination unit which determines whether or not the terminal voltage of the battery cell reaches the lower limit or the upper limit of a predetermined voltage range, and a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

In a method for operating a redox flow battery according to the present invention, electrolytes are circulated and supplied from electrolyte tanks to a battery cell by pumps, and charging and discharging are performed through a power converter. The method for operating a redox flow battery according to the present invention includes an SOC measurement step, a terminal-voltage measurement step, a reference-flow-rate acquisition step, a terminal-voltage determination step, and a pump-flow-rate setting step, which will be described below.

In the SOC measurement step, the state of charge of the electrolytes is measured.

In the terminal-voltage measurement step, a terminal voltage of the battery cell is measured.

In the reference-flow-rate acquisition step, a reference flow rate of the pumps corresponding to the state of charge of the electrolytes is acquired.

In the terminal-voltage determination step, it is determined whether or not the terminal voltage of the battery cell reaches the lower limit or the upper limit of a predetermined voltage range.

In the pump-flow-rate setting step, in the case where the terminal voltage does not reach the upper or lower limit of the predetermined voltage range, the reference flow rate is set for the pumps, and in the case where the terminal voltage reaches the upper or lower limit of the predetermined voltage range, a flow rate obtained by adding a predetermined flow rate to the reference flow rate is set for the pumps.

Advantageous Effects of Invention

In the redox flow battery system, the pump control unit, and the method for operating a redox flow battery according to the present invention, pump loss can be reduced and stable operation is possible.

DESCRIPTION OF EMBODIMENTS

Description of Embodiments of the Present Invention

The present inventors have performed thorough studies and, as a result, have found that, during the operation of a redox flow battery, in the case where the pump flow rate is controlled in response to the state of charge of electrolytes (open circuit voltage of the battery cell), the terminal voltage of the battery cell may momentarily vary depending on the operating conditions.

In a battery cell, charging and discharging are controlled by a power converter (e.g., an AC-DC converter, a DC-DC converter, or the like). In general, in a power converter, an operating voltage is set, and the power converter is designed to stop when the terminal voltage of the battery cell falls below the minimum operating voltage. Furthermore, there is a possibility that, when the terminal voltage of the battery cell exceeds the upper limit voltage (maximum voltage), the battery cell will deteriorate or fail. Accordingly, in the power converter, the maximum operating voltage is set to the upper limit voltage of the battery cell, and the power converter is designed to stop when the terminal voltage of the battery cell exceeds the upper limit voltage.

There is a correlation between the state of charge of the electrolytes (open circuit voltage) and the terminal voltage, and it has been considered that when charging and discharging are performed in the state of charge within a range capable of charging and discharging, from the discharging end to the full charging, the terminal voltage is usually maintained within the range of the operating voltage of the power converter. However, the present inventors have performed thorough studies and found that, depending on the operating conditions, such as the pump flow rate and the charge and discharge (input and output) amounts, a phenomenon occurs in which the terminal voltage falls or rises unexpectedly. Specifically, during discharging, the terminal voltage may decrease and fall below the minimum operating voltage of the power converter, and during charging, the terminal voltage may rise and exceed the maximum operating voltage of the power converter. Therefore, in existing redox flow batteries, even when the state of charge of the electrolytes is within a range capable of charging and discharging, there is a possibility that the power converter will stop and stable operation will not be possible. For example, in the case of a vanadium based redox flow battery, per single cell, the open circuit voltage at the discharging end (state of charge: 15%) is about 1.2 V/cell, and the open circuit voltage at the full charging (state of charge: 90%) is about 1.5 V/cell. The minimum operating voltage of the power converter, in terms of voltage per single cell, is set lower than the open circuit voltage at the discharging end (e.g., 1.0 V), and the maximum operating voltage of the power converter is set higher than the open circuit voltage at the full charging (e.g., 1.6 V).

The present inventors have found that, by increasing the pump flow rate, a variation in the terminal voltage can be suppressed, and unnecessary stopping of the battery can be prevented. Furthermore, it has been found that, by controlling the pump flow rate while taking into account not only the state of charge of the electrolytes but also the terminal voltage, it is possible to achieve both reduction in pump loss and stable operation. The present invention has been accomplished on the basis of the findings described above. First, embodiments of the present invention are enumerated and described.

(1) A redox flow battery system according to an embodiment includes a battery cell, electrolyte tanks, circulation pipes which circulate and supply electrolytes from the electrolyte tanks to the battery cell, pumps which circulate the electrolytes through the circulation pipes, and a power converter which is connected to the battery cell and controls charging and discharging. The redox flow battery system further includes a pump control unit which controls the flow rate of the pumps, an SOC measuring unit which measures the state of charge of the electrolytes, and a terminal-voltage measuring unit which measures a terminal voltage of the battery cell. The pump control unit includes a reference-flow-rate acquiring unit, a terminal-voltage determination unit, and a pump-flow-rate setting unit, which will be described below.

The reference-flow-rate acquiring unit acquires a reference flow rate of the pumps corresponding to the state of charge of the electrolytes.

The terminal-voltage determination unit determines whether or not the terminal voltage of the battery cell reaches the lower limit or the upper limit of a predetermined voltage range.

The pump-flow-rate setting unit sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

In the redox flow battery system, while monitoring the state of charge of the electrolytes during operation, by setting the reference flow rate corresponding to the state of charge for the pumps, pump loss can be reduced. Furthermore, while monitoring the terminal voltage of the battery cell, in the case where it is anticipated that the terminal voltage will reach the upper or lower limit of a predetermined voltage range, by adding a predetermined flow rate to the reference flow rate to increase the flow rate of the pumps, the variation in the terminal voltage can be suppressed, and it is possible to prevent the terminal voltage from reaching the upper or lower limit of the predetermined voltage range. That is, by increasing the flow rate of the pumps before the terminal voltage reaches the upper or lower limit of the predetermined voltage range, the terminal voltage can be prevented from going out of the predetermined voltage range. Specifically, during discharging, it is possible to prevent the terminal voltage from decreasing unexpectedly and falling below the lower limit of the predetermined voltage range, and during charging, it is possible to prevent the terminal voltage from increasing unexpectedly and exceeding the upper limit of the predetermined voltage range. Therefore, it is possible to avoid a problem in which, even though the state of charge of the electrolytes is within the range capable of charging and discharging, the terminal voltage goes out of the predetermined voltage range, and the battery unnecessarily stops. Consequently, when the battery cell is in a state capable of charging and discharging, unnecessary stopping of the battery can be prevented, and a charge and discharge operation can be performed continuously, thus enabling stable operation.

The term "reference flow rate" refers to the pump flow rate set in response to the state of charge both during discharging and during charging. As the reference flow rate, for example, for each state of charge, a rated output (e.g., maximum output) may be set in the case of discharging, and a minimum flow rate required to obtain a rated input may be set in the case of charging. Furthermore, the flow rate to be added is set, for example, such that the terminal voltage does not reach the upper or lower limit of the predetermined voltage range.

(2) In the redox flow battery system described above, the predetermined voltage range of the terminal voltage may be set on the basis of an operating voltage of the power converter.

In the configuration described above, by increasing the flow rate of the pumps before the terminal voltage reaches the upper or lower limit of the operating voltage of the power converter, the terminal voltage can be prevented from going out of the range of the operating voltage. Therefore, it is possible to prevent the terminal voltage from falling below the minimum operating voltage of the power converter during discharging or from exceeding the maximum operating voltage of the power converter during charging even though the state of charge of the electrolytes is within the range capable of charging and discharging. Consequently, it is possible to avoid a problem in which unnecessary stopping of the power converter causes the battery to stop, thus enabling stable operation.

(3) In the redox flow battery system described above, the SOC measuring unit may measure the state of charge of the electrolytes by measuring an open circuit voltage of the battery cell.

The state of charge (SOC) of the electrolytes can be obtained by measuring the open circuit voltage (potential difference between the positive electrode electrolyte and the negative electrode electrolyte) of the battery cell. In order to measure the open circuit voltage, for example, a monitor cell may be used. By measuring the open circuit voltage with a monitor cell, the state of charge can be obtained even during operation.

(4) In a method for operating a redox flow battery according to an embodiment, electrolytes are circulated and supplied from electrolyte tanks to a battery cell by pumps, and charging and discharging are performed through a power converter. The method for operating a redox flow battery includes an SOC measurement step, a terminal-voltage measurement step, a reference-flow-rate acquisition step, a terminal-voltage determination step, and a pump-flow-rate setting step, which will be described below.

In the SOC measurement step, the state of charge of the electrolytes is measured.

In the terminal-voltage measurement step, a terminal voltage of the battery cell is measured.

In the reference-flow-rate acquisition step, a reference flow rate of the pumps corresponding to the state of charge of the electrolytes is acquired.

In the terminal-voltage determination step, it is determined whether or not the terminal voltage of the battery cell reaches the lower limit or the upper limit of a predetermined voltage range.

In the pump-flow-rate setting step, in the case where the terminal voltage does not reach the upper or lower limit of the predetermined voltage range, the reference flow rate is set for the pumps, and in the case where the terminal voltage reaches the upper or lower limit of the predetermined voltage range, a flow rate obtained by adding a predetermined flow rate to the reference flow rate is set for the pumps.

In the method for operating a redox flow battery, while monitoring the state of charge of the electrolytes during operation, by setting the reference flow rate corresponding to the state of charge for the pumps, pump loss can be reduced. Furthermore, while monitoring the terminal voltage of the battery cell, in the case where it is anticipated that the terminal voltage will reach the upper or lower limit of a predetermined voltage range, by adding a predetermined flow rate to the reference flow rate to increase the flow rate of the pumps, in addition to taking into consideration the state of charge of the electrolytes, the variation in the terminal voltage can be suppressed, and it is possible to prevent the terminal voltage from reaching the upper or lower limit of the predetermined voltage range. Specifically, during discharging, it is possible to prevent the terminal voltage from decreasing unexpectedly and falling below the lower limit of the predetermined voltage range, and during charging, it is possible to prevent the terminal voltage from increasing unexpectedly and exceeding the upper limit of the predetermined voltage range. Therefore, it is possible to avoid a problem in which, even though the state of charge of the electrolytes is within the range capable of charging and discharging, the terminal voltage goes out of the predetermined voltage range, and the battery unnecessarily stops. Consequently, a charge and discharge operation can be performed continuously, thus enabling stable operation.

Detailed Description of Embodiments of the Present Invention

Specific examples of a redox flow battery system and a method for operating a redox flow battery according to embodiments of the present invention will be described below with reference to the drawings. Hereinafter, the "redox flow battery" may be referred to as the "RF battery" in some cases. Furthermore, in the drawings, the same reference signs denote the same components. The present invention is not limited to the examples shown below, but is defined by appended claims, and is intended to include all modifications within the meaning and scope equivalent to those of the claims.

<Overall Structure of RF Battery System>

Figure 1:
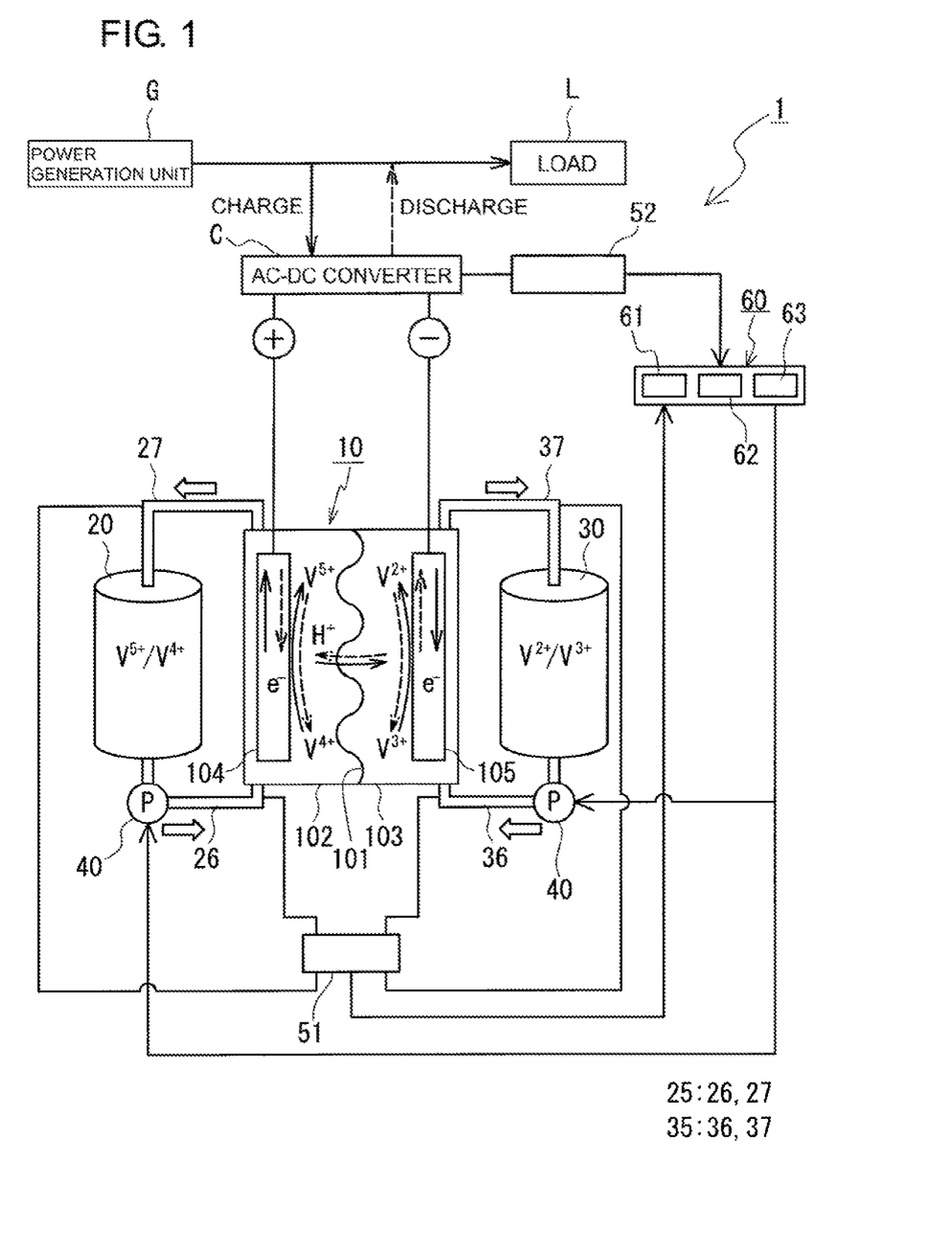
FIG. 1 is a diagram illustrating a redox flow battery system according to Embodiment 1.
Figure 2:
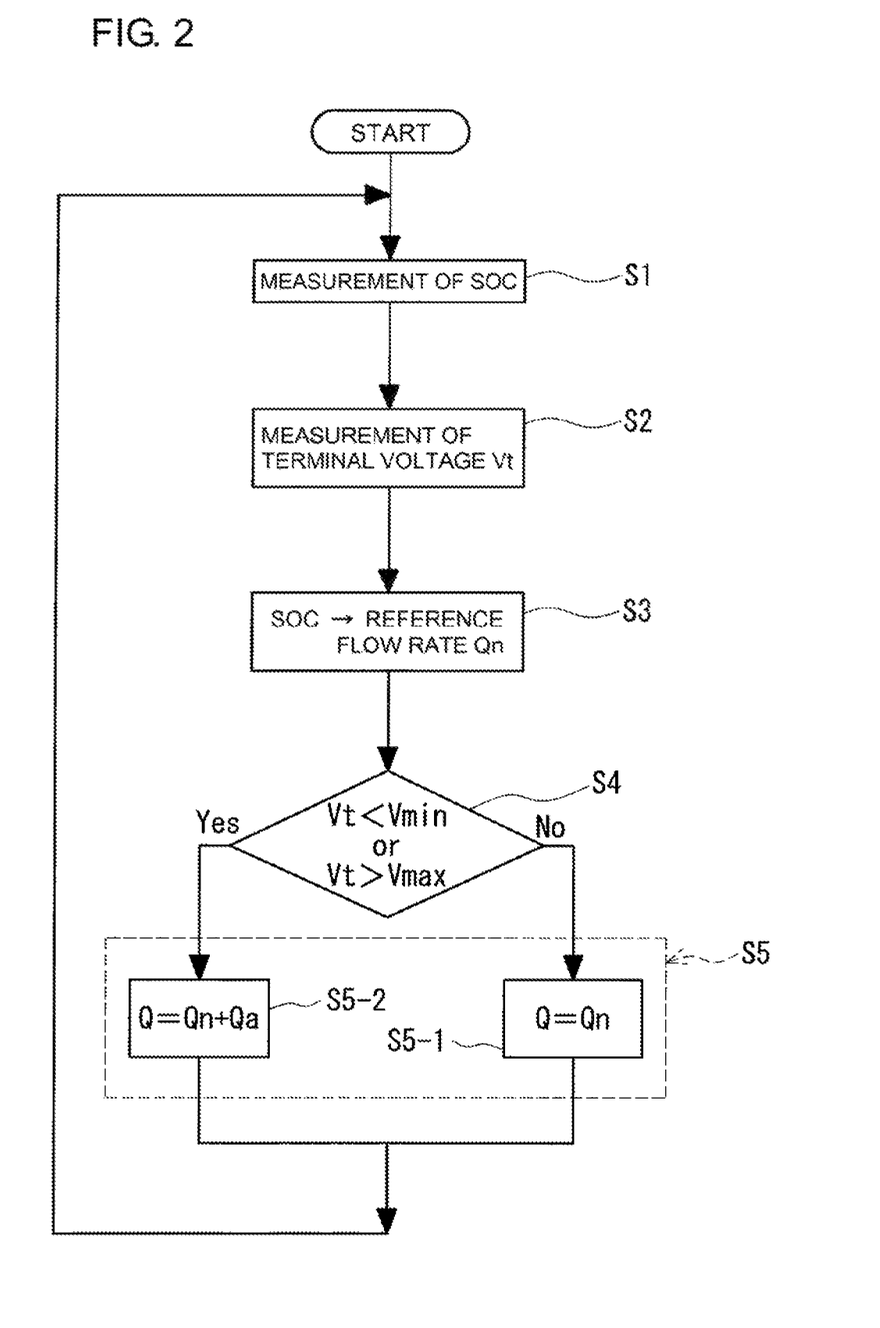
FIG. 2 is a flowchart showing a flow of controlling pumps in the redox flow battery system according to Embodiment 1.

With reference to FIGS. 1 and 2, an RF battery system 1 according to an embodiment will be described. The RF battery system 1 shown in FIG. 1, which is connected, through a power converter C (e.g., an AC-DC converter, a DC-to-DC converter such as a DC-DC converter, or the like), between a power generation unit G (e.g., a solar power generation apparatus, a wind power generation apparatus, a general power plant, or the like) and a load L (a power system or a consumer), charges electricity supplied from the power generation unit G and discharges and supplies stored electricity to the load L. Furthermore, the RF battery system 1 includes a battery cell 10 and a circulation mechanism (tanks, pipes, and pumps) configured to supply electrolytes to the battery cell 10.

(Battery Cell and Circulation Mechanism)

The RF battery system 1 includes the battery cell 10. The battery cell 10 is divided by a membrane 101 made of an ion permeable membrane into a positive electrode cell 102 and a negative electrode cell 103. The positive electrode cell 102 contains a positive electrode 104, and the negative electrode cell 103 contains a negative electrode 105. The RF battery system 1 also includes a positive electrode electrolyte tank 20 and a negative electrode electrolyte tank 30 which store a positive electrode electrolyte and a negative electrode electrolyte, respectively; a positive electrolyte circulation pipe 25 and a negative electrolyte circulation pipe 35 which circulate and supply the positive electrode electrolyte and the negative electrode electrolyte between the electrolyte tanks 20 and 30 and the battery cell 10 (the positive electrode cell 102 and the negative electrode cell 103), respectively; and pumps 40 which circulate the positive electrode electrolyte and the negative electrode electrolyte to the circulation pipes 25 and 35, respectively. The positive electrolyte circulation pipe 25 includes a positive electrolyte supply pipe 26 which sends the positive electrode electrolyte from the positive electrode electrolyte tank 20 to the positive electrode cell 102, and a positive electrolyte return pipe 27 which returns the positive electrode electrolyte from the positive electrode cell 102 to the positive electrode electrolyte tank 20. The negative electrolyte circulation pipe 35 includes a negative electrolyte supply pipe 36 which sends the negative electrode electrolyte from the negative electrode electrolyte tank 30 to the negative electrode cell 103, and a negative electrolyte return pipe 37 which returns the negative electrode electrolyte from the negative electrode cell 103 to the negative electrode electrolyte tank 30. The pumps 40 are variable speed pumps whose rotational speed can be controlled, and the flow rate can be adjusted by the rotational speed. The rotational speed (flow rate) of the pumps 40 is controlled by a pump control unit 60. While the positive electrode electrolyte and the negative electrode electrolyte are being circulated and supplied from the electrolyte tanks 20 and 30 to the battery cell 10 by the pumps 40 provided on the circulation pipes 25 and 35, respectively, battery reactions (charge-discharge reactions) are performed in response to changes in the ionic valence in the electrolytes in the battery cell 10. Note that, the RF battery system 1 shown in FIG. 1 is exemplified by a vanadium based RF battery in which V ions are used as active materials for the positive electrode and the negative electrode. Furthermore, in FIG. 1, the solid line arrow in the battery cell 10 indicates a charge reaction, and the dashed line arrow indicates a discharge reaction.

The battery cell 10 is used in the form of a cell stack (not shown) in which a plurality of single cells, each including, as constituent elements, a positive electrode 104 (positive electrode cell 102), a negative electrode 105 (negative electrode cell 103), and a membrane 101, are stacked. Cell frames are used in the cell stack, each cell frame including a bipolar plate (not shown) having a positive electrode 104 disposed on one surface thereof and a negative electrode 105 disposed on the other surface thereof, and a frame (not shown) which has liquid supply holes for supplying the positive electrode electrolyte and the negative electrode electrolyte and liquid drainage holes for discharging the electrolytes and which is formed on the outer periphery of the bipolar plate. By stacking a plurality of cell frames, the liquid supply holes and the liquid drainage holes constitute flow paths for the electrolytes, and the flow paths are connected to the circulation pipes 25 and 35. The cell stack is formed by stacking a cell frame, a positive electrode 104, a membrane 101, a negative electrode 105, a cell frame, and so on in this order.

The RF battery system 1 includes a power converter C which is connected to the battery cell 10 and controls charging and discharging. In this example, the power converter C is an AC-DC converter. The RF battery system 1 performs charging and discharging, in which charging and discharging currents are inputted and outputted to and from the positive electrode 104 and the negative electrode 105 of the battery cell 10 through the power converter (AC-DC converter) C. Specifically, during charging, a charging current is inputted to the positive electrode 104 and the negative electrode 105 of the battery cell 10 through the power converter C, and a charge reaction takes place in the battery cell 10. On the other hand, during discharging, a discharge reaction takes place in the battery cell 10, and a discharging current is outputted from the positive electrode 104 and the negative electrode 105 of the battery cell 10 through the power converter C. In the power converter (AC-DC converter) C, an operating voltage is set, and the power converter C is designed to stop when the terminal voltage of the battery cell 10 goes out of the range of the operating voltage.

(SOC Measuring Unit)

The RF battery system 1 includes an SOC measuring unit 51 which measures the state of charge (SOC) of the electrolytes. In this example, the SOC measuring unit 51 measures the SOC of the electrolytes to be supplied to the battery cell 10.

The SOC of an electrolyte is determined by the ionic valence ratio in the electrolyte. For example, in the case of a vanadium based RF battery, in a positive electrode electrolyte, the SOC is represented by the ratio of $V^{5+}$ in V ions ($V^{4+}/V^{5+}$) in the positive electrode electrolyte, and in a negative electrode electrolyte, the SOC is represented by the ratio of $V^{2+}$ in V ions ($V^{2+}/V^{3+}$), as expressed by the formulas below. In the battery reaction during charging, in the battery cell, $V^{4+}$ is oxidized to $V^{5+}$ at the positive electrode, and $V^{3+}$ is reduced to $V^{2+}$ at the negative electrode. The battery reaction during discharging is opposite to that during charging.

Positive electrode: $V^{5+}/(V^{4+}+V^{5+})$
Negative electrode: $V^{2+}/(V^{2+}+V^{3+})$ Furthermore, since the standard oxidation-reduction potential varies depending on the ionic valence, there is a correlation between the ionic valence ratio in the electrolyte and the potential of the electrolyte, and it is possible to obtain the SOC from the potential of the electrolyte. For example, the standard oxidation-reduction potential for $V^{5+}$ is 1.00 V and the standard oxidation-reduction potential for $V^{2+}$ is −0.26 V.

In general, in an RF battery, battery reactions correspond to changes in the ionic valence in electrolytes, and the positive electrode electrolyte and the negative electrode electrolyte have the same SOC. Accordingly, the SOC may be obtained by measuring the ionic valence ratio in the electrolyte in the positive electrode electrolyte or the negative electrode electrolyte, or by measuring the potential of the electrolyte. Furthermore, the SOC may be obtained by measuring a potential difference (open circuit voltage) between the positive electrode electrolyte and the negative electrode electrolyte. Furthermore, depending on the metal ion of the active material, the hue, transparency, or absorbance of the electrolyte varies with the ionic valence ratio in the electrolyte, and therefore, the SOC may be obtained by using the hue, transparency, or absorbance of the electrolyte as an indicator. For example, a voltmeter may be used to measure the potential of the electrolyte, a monitor cell may be used to measure the potential difference (open circuit voltage), and a spectrophotometer may be used to measure the hue, transparency, or absorbance of the electrolyte. A monitor cell is a battery cell which has the same structure as that of the battery cell 10, but is not connected to the power converter C, and which does not contribute to charging and discharging. By supplying the positive electrode electrolyte and the negative electrode electrolyte to the monitor cell, as in the battery cell 10, and by measuring an open circuit voltage of the monitor cell, the SOC can be obtained even during operation.

In this example, the SOC measuring unit 51 uses a monitor cell, and by measuring the open circuit voltage of the monitor cell, the SOC of the electrolytes is measured. The monitor cell 51 is provided such that part of the positive electrode electrolyte and part of the negative electrode electrolyte are supplied from the positive electrolyte supply pipe 26 and the negative electrolyte supply pipe 36, respectively, to the monitor cell 51, and the electrolytes are returned from the monitor cell 51 to the positive electrolyte return pipe 27 and the negative electrolyte return pipe 37. Since the same electrolytes as those to be supplied to the battery cell 10 are supplied to the monitor cell 51, to measure the open circuit voltage of the monitor cell 51 means the same as to measure the open circuit voltage of the battery cell 10. The measured value of the open circuit voltage (SOC) measured by the monitor cell 51 is sent to the pump control unit 60 through a signal line. In addition, the SOC measuring unit 51 may measure the SOC of the electrolyte in each of the electrolyte tanks 20 and 30.

(Terminal-Voltage Measuring Unit)

The RF battery system 1 includes a terminal-voltage measuring unit 52 which measures a terminal voltage (Vt) of the battery cell 10. In this example, the terminal-voltage measuring unit 52 uses a voltmeter and is provided on the power converter (AC-DC converter) C. The measured value of the terminal voltage measured by the terminal-voltage measuring unit 52 is sent to the pump control unit 60 through a signal line.

(Pump Control Unit)

The RF battery system 1 includes the pump control unit 60 which controls the flow rate of the pumps 40 by controlling the rotational speed of the pumps. The pump control unit 60 includes a reference-flow-rate acquiring unit 61, a terminal-voltage determination unit 62, and a pump-flow-rate setting unit 63. The pump control unit 60 can use a computer.

(Reference-Flow-Rate Acquiring Unit)

The reference-flow-rate acquiring unit 61 acquires a reference flow rate (Qn) of the pumps corresponding to the SOC of the electrolytes measured by the SOC measuring unit 51. The reference flow rate (Qn) refers to a pump flow rate set in response to each SOC both during discharging and during charging. In this example, both during discharging and during charging, for each SOC, a rated output (e.g., maximum output) is obtained in the case of discharging and a minimum flow rate required to obtain a rated input is obtained in the case of charging, in advance by an experiment or the like. These minimum required flow rates are defined as reference flow rates (Qn). The reference flow rates (Qn) are stored in the memory of a computer in advance so as to correspond to the SOC, and the reference-flow-rate acquiring unit 61 acquires a reference flow rate (Qn) corresponding to the SOC from the memory.

Furthermore, the reference flow rate (Qn) may be set by obtaining a minimum required flow rate corresponding to each SOC for each charge or discharge (input or output) amount or each electrolyte temperature, both during discharging and during charging.

(Terminal-Voltage Determination Unit)

The terminal-voltage determination unit 62 determines whether or not the terminal voltage (Vt) of the battery cell 10 measured by the terminal-voltage measuring unit 52 reaches the lower limit or the upper limit of a predetermined voltage range. In this example, the predetermined voltage range of the terminal voltage (Vt) is set on the basis of an operating voltage of the power converter C, in which the lower limit is set to the minimum operating voltage of the power converter C, and the upper limit is set to the maximum operating voltage of the power converter C (the upper limit voltage of the battery cell 10). Furthermore, in this example, regarding the determination whether or not the terminal voltage (Vt) reaches the lower limit or the upper limit of a predetermined voltage range, it is determined that the terminal voltage (Vt) reaches the lower limit or the upper limit when the terminal voltage (Vt) comes close to the lower limit of the predetermined voltage range (minimum operating voltage) or the upper limit (maximum operating voltage). For example, when the terminal voltage (Vt) reaches within a predetermined range from the lower limit or the upper limit of the operating voltage of the power converter C (e.g., within a range of 5% or 10% from the upper or lower limit), it is determined that the terminal voltage (Vt) reaches the lower limit or the upper limit.

(Pump-Flow-Rate Setting Unit)

In the case where the terminal-voltage determination unit 62 determines that the terminal voltage (Vt) does not reach the upper or lower limit of the predetermined voltage range, the pump-flow-rate setting unit 63 sets the reference flow rate (Qn) acquired by the reference-flow-rate acquiring unit 61, as the pump flow rate (Q), for the pumps 40. On the other hand, in the case where the terminal-voltage determination unit 62 determines that the terminal voltage (Vt) reaches the upper or lower limit of the predetermined voltage range, the pump-flow-rate setting unit 63 sets a flow rate (Qn+Qa) obtained by adding a predetermined flow rate (Qa) to the reference flow rate (Qn), as the pump flow rate (Q), for the pumps 40. That is, in the case where it is anticipated that the terminal voltage (Vt) will reach the upper or lower limit of the predetermined voltage range, the flow rate of the pumps 40 is increased. The flow rate (Qa) to be added is set such that the terminal voltage (Vt) does not reach the lower limit of the predetermined voltage range (minimum operating voltage) or the upper limit (maximum operating voltage). For example, the reference flow rate (Qn) may be increased by 10% or 20% or the pump flow rate (Q) may be set to a rated flow rate (e.g., maximum flow rate). In order to set the flow rate (Qa) to be added, it is preferable to obtain, in advance by an experiment or the like, a minimum flow rate required to prevent the terminal voltage (Vt) from reaching the upper or lower limit of the predetermined voltage range.

The flow rate of the pumps 40 may be controlled by setting a control parameter, such as pump rotational speed, discharge amount, or discharge pressure, in accordance with the pump flow rate to be set (the reference flow rate or a flow rate obtained by adding a predetermined flow rate to the reference flow rate). For example, the control parameter, such as pump rotational speed, discharge amount, or discharge pressure, according to the pump flow rate is determined in advance, a control parameter value corresponding to the flow rate to be set is acquired from a relational expression or a relational table showing the relationship between the flow rate and the control parameter, and by setting the control parameter value, the flow rate of the pumps may be controlled.

<Method for Operating RF Battery System>

A method for operating the RF battery system 1 including the SOC measuring unit 51, the terminal-voltage measuring unit 52, and the pump control unit 60 will be described below. The method for operation the RF battery system 1 is an operation method in which the flow rate of the pumps 40 is controlled on the basis of the state of charge of the electrolytes and the terminal voltage, and includes an SOC measurement step, a terminal-voltage measurement step, a reference-flow-rate acquisition step, a terminal-voltage determination step, and a pump-flow-rate setting step, which will be described below. Specific processing in each step will be described below with reference to the flowchart shown in FIG. 2.

(SOC Measurement Step)

In the SOC measurement step, the state of charge (SOC) of the electrolytes is measured (step S1). In this example, as described above, the SOC of the electrolytes to be supplied to the battery cell 10 is measured by the SOC measuring unit (monitor cell) 51.

(Terminal-Voltage Measurement Step)

In the terminal-voltage measurement step, a terminal voltage (Vt) of the battery cell 10 is measured (step S2). In this example, as described above, the terminal voltage (Vt) is measured by the terminal-voltage measuring unit 52.

(Reference-Flow-Rate Acquisition Step)

In the reference-flow-rate acquisition step, a reference flow rate (Qn) of the pumps corresponding to the SOC of the electrolytes measured in the SOC measurement step S1 is acquired (step S3). In this example, as described above, the reference flow rate (Qn) corresponding to the SOC is acquired from the memory of a computer by the reference-flow-rate acquiring unit 61 of the pump control unit 60.

(Terminal-Voltage Determination Step)

In the terminal-voltage determination step, it is determined whether or not the terminal voltage (Vt) of the battery cell 10 measured in the terminal-voltage measurement step S2 reaches the lower limit or the upper limit of a predetermined voltage range (step S4). In this example, as described above, it is determined whether or not the terminal voltage (Vt) reaches the lower limit or the upper limit of the predetermined voltage range by the terminal-voltage determination unit 62 of the pump control unit 60 on the basis of whether or not the terminal voltage (Vt) comes close to the minimum operating voltage or the maximum operating voltage of the power converter C, specifically, whether or not the terminal voltage (Vt) reaches within a predetermined range from the minimum operating voltage or the maximum operating voltage (in FIG. 2, "Vmin" denotes the predetermined range from the minimum operating voltage, i.e., the lower limit, and "Vmax" denotes the predetermined range from the maximum operating voltage, i.e., the upper limit). It is determined that the terminal voltage reaches the lower limit or the upper limit when the terminal voltage comes close to the minimum operating voltage or the maximum operating voltage, that is, when the terminal voltage reaches within a predetermined range from the minimum operating voltage or the maximum operating voltage.

(Pump-Flow-Rate Setting Step)

In the pump-flow-rate setting step, on the basis of the result of determination whether or not the terminal voltage (Vt) reaches the lower limit or the upper limit of the predetermined voltage range in the terminal-voltage determination step S4, the flow rate of the pumps is set (step S5). Specifically, in the case where it is determined that the terminal voltage (Vt) does not reach the upper or lower limit of the predetermined voltage range in the terminal-voltage determination step S4, the reference flow rate (Qn) acquired by the reference-flow-rate acquiring unit 61 is set as the pump flow rate (Q) for the pumps 40 (step S5-1). On the other hand, in the case where it is determined that the terminal voltage (Vt) reaches the upper or lower limit of the predetermined voltage range in the terminal-voltage determination step S4, a flow rate (Qn+Qa) obtained by adding a predetermined flow rate (Qa) to the reference flow rate (Qn) is set as the pump flow rate (Q) for the pumps 40 (step S5-2). In the case where the flow rate (Qa) has been added in a previous pump-flow-rate setting step, the flow rate (Qa) to be added may be increased.

In the RF battery system 1 according to Embodiment 1 described above, while constantly monitoring the SOC of the electrolytes during operation, by setting the reference flow rate corresponding to the SOC for the pumps 40, pump loss can be reduced. Furthermore, while constantly monitoring the terminal voltage of the battery cell 10, in the case where it is anticipated that the terminal voltage (Vt) will reach the upper or lower limit of a predetermined voltage range, by adding a predetermined flow rate to the reference flow rate to increase the flow rate of the pumps 40, the variation in the terminal voltage (Vt) can be suppressed. Consequently, it is possible to prevent a problem in which, even though the SOC is within the range capable of charging and discharging, the terminal voltage (Vt) goes out of the predetermined voltage range, and thus, stable operation is possible.

In the RF battery system 1 according to Embodiment 1 described above, an example in which the SOC of the electrolytes to be supplied to the battery cell 10 is measured by the SOC measuring unit 51 has been described. However, the SOC to be measured may be the SOC of the electrolytes to be discharged from the battery cell 10.

In the RF battery system 1 according to Embodiment 1 described above, an example of a vanadium based RF battery in which V ions are used as active materials for the positive electrode and the negative electrode has been described. However, the present invention is applicable to, in addition to the vanadium based RF battery, an iron-chromium based RF battery, and a titanium-manganese based RF battery in which Mn ions are used as the positive electrode active material, and Ti ions are used as the negative electrode active material.

The present description also discloses the following inventions;

(1) A pump control unit to be mounted on a redox flow battery system, the redox flow battery system including:
a battery cell;
electrolyte tanks;
circulation pipes which circulate and supply electrolytes from the electrolyte tanks to the battery cell;
pumps which circulate the electrolytes through the circulation pipes;
a power converter which is connected to the battery cell and controls charging and discharging;
an SOC measuring unit which measures the state of charge of the electrolytes; and
a terminal-voltage measuring unit which measures a terminal voltage of the battery cell,
the pump control unit, which controls the flow rate of the pumps, including:
a reference-flow-rate acquiring unit which acquires a reference flow rate of the pumps corresponding to the state of charge of the electrolytes;
a terminal-voltage determination unit which determines whether or not the terminal voltage of the battery cell reaches the lower limit or the upper limit of a predetermined voltage range; and
a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

In this case, while monitoring the state of charge of the electrolytes during operation, by setting the reference flow rate corresponding to the state of charge for the pumps, pump loss can be reduced. Furthermore, while monitoring the terminal voltage of the battery cell, in the case where it is anticipated that the terminal voltage will reach the upper or lower limit of a predetermined voltage range, by adding a predetermined flow rate to the reference flow rate to increase the flow rate of the pumps, the variation in the terminal voltage can be suppressed, and it is possible to prevent the terminal voltage from reaching the upper or lower limit of the predetermined voltage range.

(2) In the pump control unit according to (1), the predetermined voltage range of the terminal voltage may be set on the basis of an operating voltage of the power converter.

In this case, by increasing the flow rate of the pumps before the terminal voltage reaches the upper or lower limit of the operating voltage of the power converter, the terminal voltage can be prevented from going out of the range of the operating voltage.

(3) In the pump control unit according to (1) or (2), the SOC measuring unit may measure the state of charge of the electrolytes by measuring at least one of an open circuit voltage of the battery cell and a voltage corresponding to the open circuit voltage of the battery cell.

In this case, the state of charge (SOC) of the electrolytes can be obtained by measuring the open circuit voltage (potential difference between the positive electrode electrolyte and the negative electrode electrolyte) of the battery cell.

(4) A redox flow battery system including:
a battery cell;

pumps which supply electrolytes to the battery cell;

a pump control unit which controls the flow rate of the pumps;

an SOC measuring unit which measures the state of charge of the electrolytes; and a terminal-voltage measuring unit which measures a terminal voltage of the battery cell, the pump control unit including:

a reference-flow-rate acquiring unit which acquires a reference flow rate of the pumps corresponding to the state of charge of the electrolytes;

a terminal-voltage determination unit which determines whether or not the terminal voltage of the battery cell reaches the lower limit or the upper limit of a predetermined voltage range; and a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

In this case, while monitoring the state of charge of the electrolytes during operation, by setting the reference flow rate corresponding to the state of charge for the pumps, pump loss can be reduced. Furthermore, while monitoring the terminal voltage of the battery cell, in the case where it is anticipated that the terminal voltage will reach the upper or lower limit of a predetermined voltage range, by adding a predetermined flow rate to the reference flow rate to increase the flow rate of the pumps, the variation in the terminal voltage can be suppressed, and it is possible to prevent the terminal voltage from reaching the upper or lower limit of the predetermined voltage range.

(5) The redox flow battery system according to (4) may include a power converter which is connected to the battery cell and controls charging and discharging.

(6) In the redox flow battery system according to (5), the predetermined voltage range of the terminal voltage may be set on the basis of an operating voltage of the power converter.

In this case, by increasing the flow rate of the pumps before the terminal voltage reaches the upper or lower limit of the operating voltage of the power converter, the terminal voltage can be prevented from going out of the range of the operating voltage.

(7) In the redox flow battery system according to any one of (4) to (6), the SOC measuring unit may measure the state of charge of the electrolytes by measuring an open circuit voltage of the battery cell.

In this case, the state of charge (SOC) of the electrolytes can be obtained by measuring the open circuit voltage (potential difference between the positive electrode electrolyte and the negative electrode electrolyte) of the battery cell.

(8) The redox flow battery system according to any one of (4) to (7) may further include electrolyte tanks and circulation pipes which circulate and supply the electrolytes from the electrolyte tanks to the battery cell.

INDUSTRIAL APPLICABILITY

The redox flow battery system according to the present invention is applicable to large-capacity storage batteries intended to be used for smoothing variations in output of power generation using natural energy, storing surplus electricity, levelling of loads, and the like. The pump control unit according to the present invention can be applied to redox flow battery systems intended to be used for smoothing variations in output of power generation using natural energy, storing surplus electricity, levelling of loads, and the like. The method for operating a redox flow battery according to the present invention is applicable to operation of a redox flow battery system which includes pumps for circulating electrolytes to a battery cell.

REFERENCE SIGNS LIST 1 redox flow battery system
10 battery cell
101 membrane
102 positive electrode cell
103 negative electrode cell
104 positive electrode
105 negative electrode
20 positive electrode electrolyte tank
25 positive electrolyte circulation pipe
26 positive electrolyte supply pipe
27 positive electrolyte return pipe
30 negative electrode electrolyte tank
35 negative electrolyte circulation pipe
36 negative electrolyte supply pipe
37 negative electrolyte return pipe
40 pump
51 SOC measuring unit (monitor cell)
52 terminal-voltage measuring unit
60 pump control unit
61 reference-flow-rate acquiring unit
62 terminal-voltage determination unit
63 pump-flow-rate setting unit
C power converter (AC-DC converter)
G power generation unit
L load

The invention claimed is:

1. A redox flow battery system comprising:
a battery cell;
electrolyte tanks;
circulation pipes which circulate and supply electrolytes from the electrolyte tanks to the battery cell;
pumps which circulate the electrolytes through the circulation pipes;
a power converter which is connected to the battery cell and controls charging and discharging;
a pump control unit which controls the flow rate of the pumps;
an SOC measuring unit which measures the state of charge of the electrolytes; and
a terminal-voltage measuring unit which measures a terminal voltage of the battery cell,
wherein the pump control unit includes:
a reference-flow-rate acquiring unit which acquires a reference flow rate of the pumps corresponding to the state of charge of the electrolytes;
a terminal-voltage determination unit which determines whether or not the terminal voltage of the battery cell reaches the lower limit or the upper limit of a predetermined voltage range; and
a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

2. The redox flow battery system according to claim 1, wherein the predetermined voltage range of the terminal voltage is set on the basis of an operating voltage of the power converter.

3. The redox flow battery system according to claim 1, wherein the SOC measuring unit measures the state of charge of the electrolytes by measuring an open circuit voltage of the battery cell.

4. A pump control unit to be mounted on a redox flow battery system, the redox flow battery system including:
a battery cell;
electrolyte tanks;
circulation pipes which circulate and supply electrolytes from the electrolyte tanks to the battery cell;
pumps which circulate the electrolytes through the circulation pipes;
a power converter which is connected to the battery cell and controls charging and discharging;
an SOC measuring unit which measures the state of charge of the electrolytes; and
a terminal-voltage measuring unit which measures a terminal voltage of the battery cell,
the pump control unit, which controls the flow rate of the pumps, comprising:
a reference-flow-rate acquiring unit which acquires a reference flow rate of the pumps corresponding to the state of charge of the electrolytes;
a terminal-voltage determination unit which determines whether or not the terminal voltage of the battery cell reaches the lower limit or the upper limit of a predetermined voltage range; and
a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

5. The pump control unit according to claim 4, wherein the predetermined voltage range of the terminal voltage is set on the basis of an operating voltage of the power converter.

6. The pump control unit according to claim 4, wherein the SOC measuring unit measures the state of charge of the electrolytes by measuring at least one of an open circuit voltage of the battery cell and a voltage corresponding to the open circuit voltage of the battery cell.

7. A redox flow battery system comprising:
a battery cell;
pumps which supply electrolytes to the battery cell;
a pump control unit which controls the flow rate of the pumps;
an SOC measuring unit which measures the state of charge of the electrolytes; and
a terminal-voltage measuring unit which measures a terminal voltage of the battery cell,
wherein the pump control unit includes:
a reference-flow-rate acquiring unit which acquires a reference flow rate of the pumps corresponding to the state of charge of the electrolytes;
a terminal-voltage determination unit which determines whether or not the terminal voltage of the battery cell reaches the lower limit or the upper limit of a predetermined voltage range; and
a pump-flow-rate setting unit which sets the reference flow rate for the pumps in the case where the terminal voltage does not reach the upper or lower limit of the predetermined voltage range, and sets a flow rate obtained by adding a predetermined flow rate to the reference flow rate for the pumps in the case where the terminal voltage reaches the upper or lower limit of the predetermined voltage range.

8. The redox flow battery system according to claim 7, further comprising a power converter which is connected to the battery cell and controls charging and discharging.

9. The redox flow battery system according to claim 8, wherein the predetermined voltage range is set on the basis of an operating voltage of the power converter.

10. The redox flow battery system according to claim 7, wherein the SOC measuring unit measures the state of charge of the electrolytes by measuring an open circuit voltage of the battery cell.

11. The redox flow battery system according to claim 7, further comprising electrolyte tanks and circulation pipes which circulate and supply the electrolytes from the electrolyte tanks to the battery cell.

12. A method for operating a redox flow battery, in which electrolytes are circulated and supplied from electrolyte tanks to a battery cell by pumps, and charging and discharging are performed through a power converter, the method comprising:
an SOC measurement step in which the state of charge of the electrolytes is measured;
a terminal-voltage measurement step in which a terminal voltage of the battery cell is measured;
a reference-flow-rate acquisition step in which a reference flow rate of the pumps corresponding to the state of charge of the electrolytes is acquired;
a terminal-voltage determination step in which it is determined whether or not the terminal voltage of the battery cell reaches the lower limit or the upper limit of a predetermined voltage range; and
a pump-flow-rate setting step in which, in the case where the terminal voltage does not reach the upper or lower limit of the predetermined voltage range, the reference flow rate is set for the pumps, and in the case where the terminal voltage reaches the upper or lower limit of the predetermined voltage range, a flow rate obtained by adding a predetermined flow rate to the reference flow rate is set for the pumps.

* * * * *

UNITED STATES PATENT AND TRADEMARK OFFICE
CERTIFICATE OF CORRECTION

PATENT NO. : 10,665,881 B2
APPLICATION NO. : 15/302422
DATED : May 26, 2020
INVENTOR(S) : Takahiro Kumamoto et al.

It is certified that error appears in the above-identified patent and that said Letters Patent is hereby corrected as shown below:

On the Title Page

In item (57), the Abstract, Line 2, "SQC" should be --SOC--.
In item (57), the Abstract, Line 8, "ripper" should be --upper--.
In item (57), the Abstract, Line 14, "ease" should be --case--.

Signed and Sealed this
Twenty-seventh Day of October, 2020

Andrei Iancu
*Director of the United States Patent and Trademark Office*